G. H. TACKMAN.
HATCH COVER.
APPLICATION FILED FEB. 19, 1909.
935,431.
Patented Sept. 28, 1909.
3 SHEETS—SHEET 1.
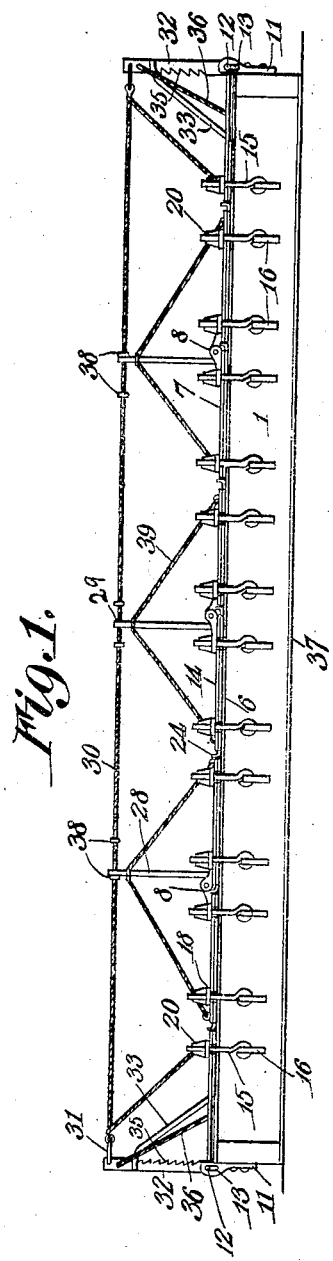
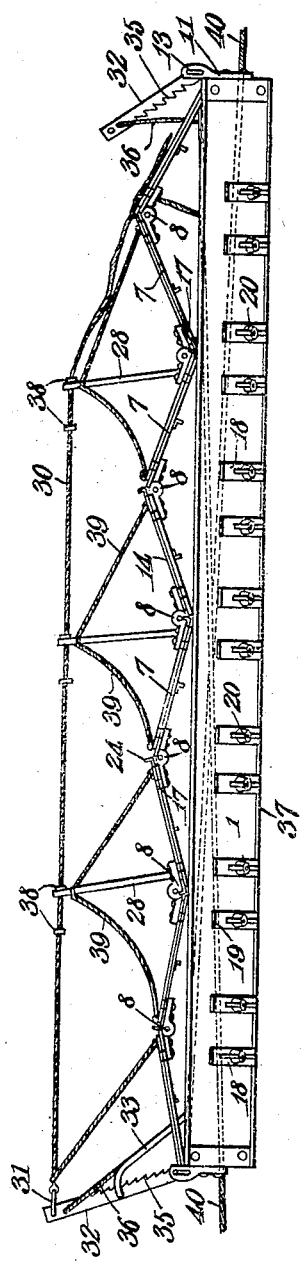
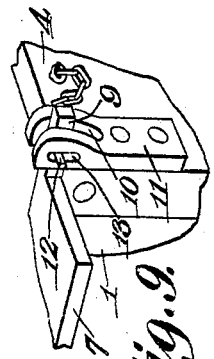
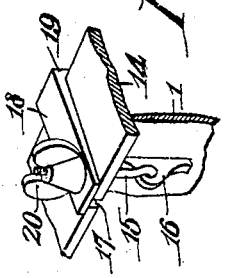
Inventor
Gustav H. Tackman,
By Victor J. Evans.
Attorney.
Witnesses

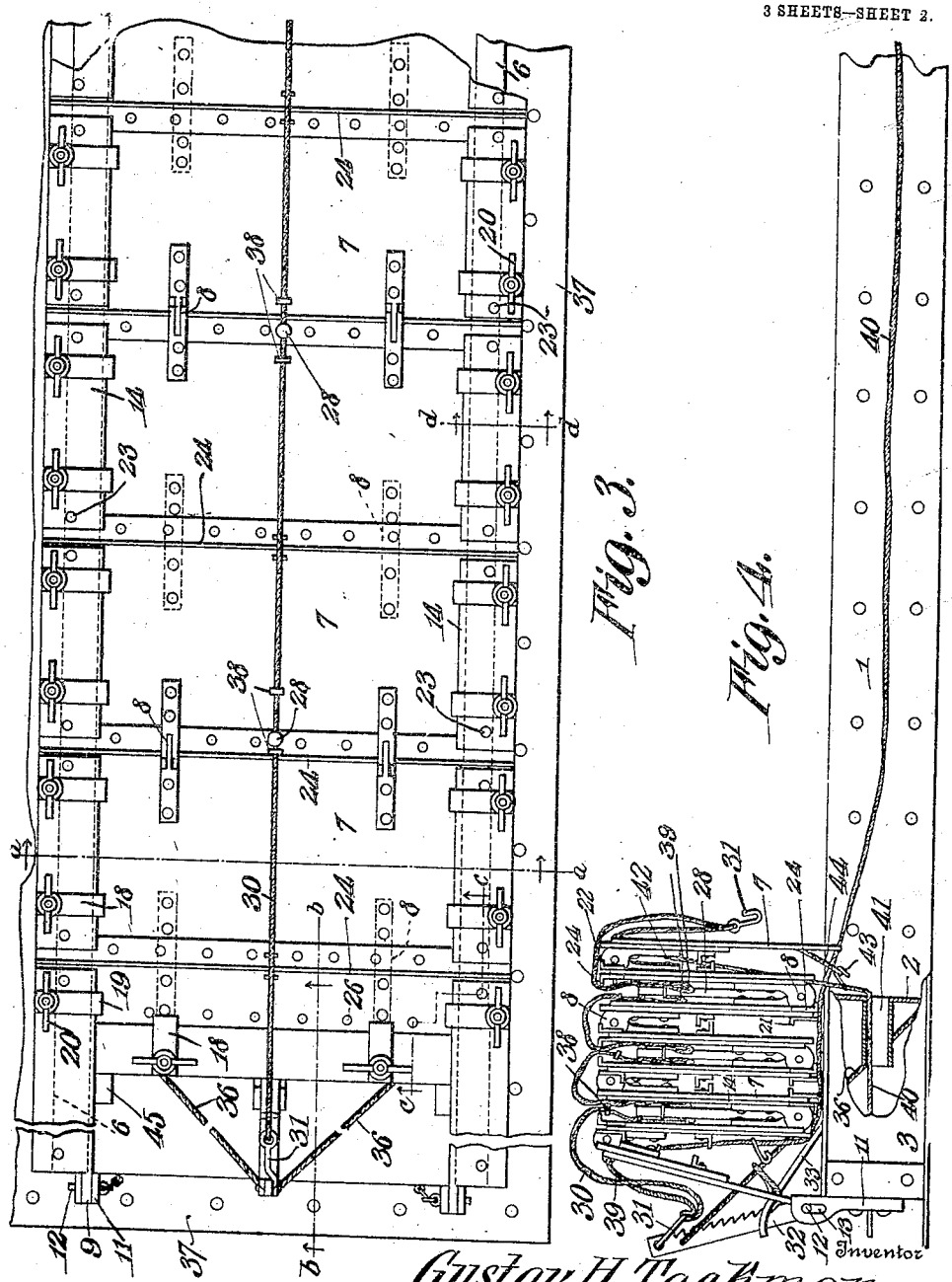

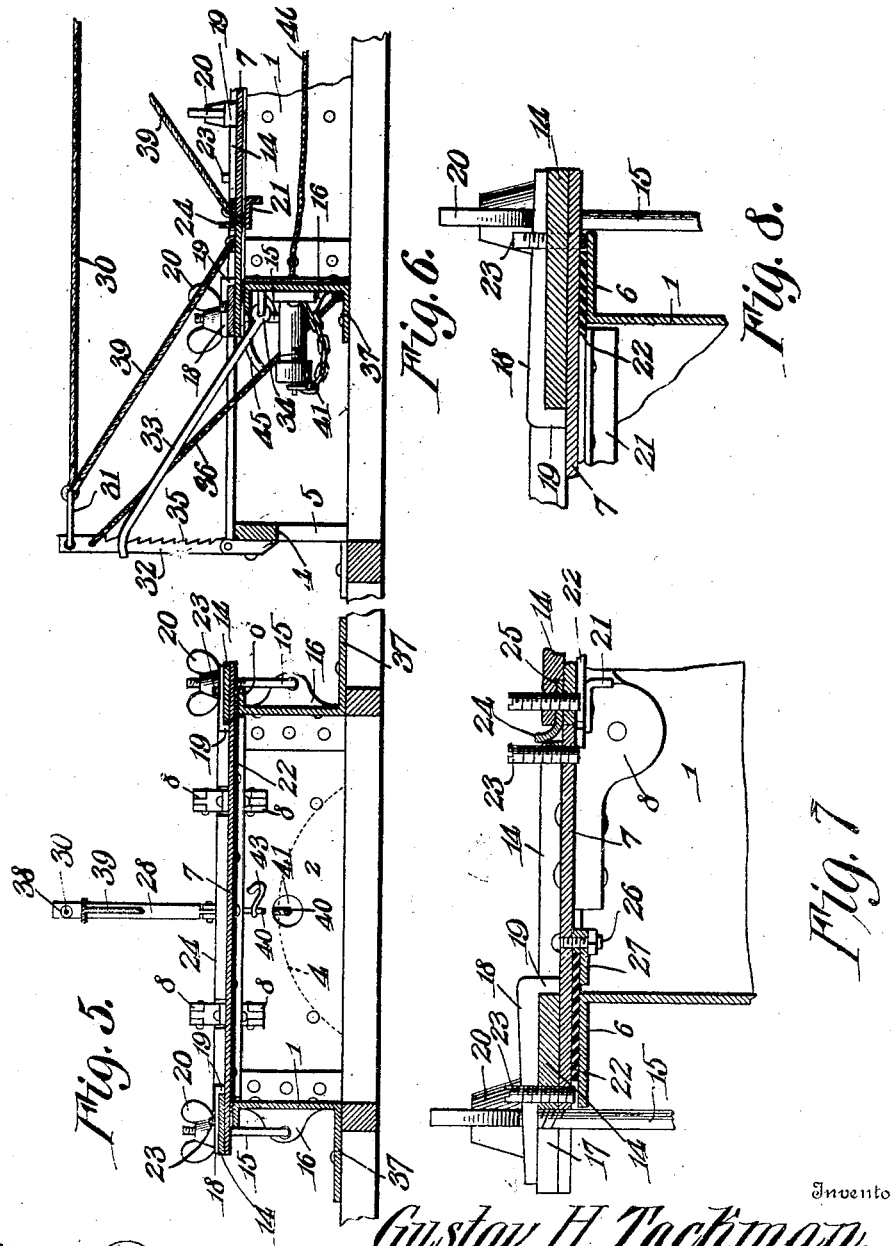

UNITED STATES PATENT OFFICE.

GUSTAV H. TACKMAN, OF CHICAGO, ILLINOIS.

HATCH-COVER.

935,431.  Specification of Letters Patent.  Patented Sept. 28, 1909.

Application filed February 19, 1909. Serial No. 478,895.

*To all whom it may concern:*

Be it known that I, GUSTAV H. TACKMAN, a citizen of the United States, residing at Chicago, in the county of Cook and State of Illinois, have invented new and useful Improvements in Hatch-Covers, of which the following is a specification.

This invention relates to hatch covers, the main object of the invention being to provide a cover for the hatchways of vessels which will be practically air and water tight and which at the same time is adapted to be conveniently opened and closed.

With the above and other objects in view the nature of which will more fully appear as the description proceeds, the invention consists in the novel construction, combination and arrangement of parts as herein fully described, illustrated and claimed.

In the accompanying drawings: Figure 1 is a longitudinal elevation of a hatch-way showing the hatch cover applied thereto and clamped down. Fig. 2 is a similar view showing the hatch cover partly opened. Fig. 3 is a plan view of the same with the hatch cover clamped down. Fig. 4 is a longitudinal elevation partly in section on an enlarged scale through a portion of the hatch-way, showing the hatch cover sections in their completely opened position. Fig. 5 is a vertical cross section on the line *a—a* of Fig. 3. Fig. 6 is a detail vertical longitudinal section on the line *b—b* of Fig. 3. Fig. 7 is a detail vertical longitudinal section on the line *c—c* of Fig. 3. Fig. 8 is a detail cross section on the line *d—d* of Fig. 3. Fig. 9 is a detail perspective view showing the tongue and keeper arrangement at one end of the hatch way. Fig. 10 is a detail perspective view showing portions of the coaming and hatch cover and the relation of one of the clamps thereto.

Referring to the drawings the hatch-way comprises the longitudinal coaming sections 1 forming the side walls of the hatchway, and the transverse sections 2 constitute the end walls of the hatch-way, the side walls or sections 1 extending at both ends beyond the end walls 2 as shown at 3 and being connected beyond the end walls by means of end cross bars 4 supported at opposite ends by posts or uprights 5. The side and end walls or coaming sections are provided at their top with outwardly projecting head flanges 6 to provide ample surface for the support of the hatch cover sections and the packing or sealing strips to be hereinafter particularly described.

As shown in Figs. 1, 2 and 3, the hatch cover as a whole is made up of a suitable number of sections 7 which are hinged together along their meeting edges as shown at 8, ordinary strap hinges being preferably used for this purpose and the hinges being arranged alternately above and beneath the sections as best indicated in Fig. 2 to enable the sections to be folded like a bellows. The complete hatch cover, comprising all of the sections, is of sufficient length to extend the entire length of the side sections 1 of the coaming and the end sections 7 are provided at their opposite corners with tongues 9 which are received in slots 10 of keepers 11 secured fixedly to the opposite ends of the coaming as shown in Figs. 1 and 2, each of said tongues 9 being detachably mounted in the slot 10 of its respective keeper as best illustrated in Fig. 9 and being normally maintained in place by means of a pin or key 12 inserted through the tongue 9 and also through oppositely arranged vertical slots 13 in the keeper thus providing for a slight up and down movement of the tongues 9 in the operation of folding the cover sections back out of the way to make the hatch-way accessible throughout its entire length.

When the hatch cover is in its closed position, the sections thereof are held down by clamps and in carrying out this feature of the invention, which is very important in order to obtain an air and liquid tight joint, each of the hatch cover sections 7 is provided at its opposite ends with end cleats 14 which greatly strengthen and reinforce the hatch cover sections 7. This enables the main bodies of the hatch cover sections to be formed out of comparatively thin metal, the cleats 14 being also formed of metal of heavier gage. The sections 7 and the cleats 14 extend outward beyond the head flanges 6 of the coaming and are slotted from their outer edges inward to receive eye bolts 15, the eyes of which are connected to fixed eyes 16 on the outer side of the coaming as illustrated in detail in Fig. 10. The bolt 15 passes upward through the appropriate slot 17 in the end of the hatch cover section and also through a clamp 18 which is adapted to rest on the top of the cleat, the clamp being held in proper position by a retaining loop 19 at the inner end thereof, which loop overhangs the inner edge of the cleat. The clamp as a whole is completed by a nut 20 which may be of any suitable type, a winged nut being illustrated for convenience. In the preferred embodiment of this feature of the invention two of such clamps are employed at each end of each section 7.

In order to further strengthen the hatch cover sections, one or more angle iron cleats 21 are secured to the under side of each section, extending lengthwise of said section and having their opposite extremities lying in close proximity to the inner surfaces of the side walls of the coaming as clearly illustrated in Fig. 6, the cleats 21 thus serving as guides for directing the opening and closing movements of the sections when operated by the means hereinafter described.

Secured to the lower surfaces of the sections 7 are marginal packing strips 22 of rubber, leather or analogous material, the said strips lying between the cover section and the head flange 6 of the coaming as clearly shown in Figs. 7 and 8. The clamps hereinabove described are located directly over these packing strips so that when the clamps are tightly screwed down, said packing strips form an absolutely air and water tight joint all around the margins of the hatch cover as a whole. These packing strips would, however, interfere with the sliding movement of the cover sections, and in order to overcome this, each hatch cover section is provided with a number of offsetting devices 23 preferably in the form of screws threaded through the cleats 14 and the end portions of the hatch sections adjacent to the opposite corners thereof as shown in Fig. 3. The inner ends of these screws lie just over the uncovered portion of the head flange 6 so that by turning said screws downward they serve to elevate the ends of the hatch cover sections and raise the packing strips 22 out of contact with the head flanges 6. The cover sections are thus adapted to slide on the screws 23, thereby greatly relieving the friction which would result were the packing strips left in contact with the head flanges. Of course in clamping down the cover sections on the coaming, the screws 23 are turned upward until the packing strips 22 rest directly against the head flange of the coaming. The clamps may now be secured down tightly.

Where the meeting edges of the cover sections come together, in order to provide an air and water tight joint at such places, I provide a flexible joint-sealing strip 24 which is let into a rabbet 25 in the edge of one of the cover sections or said sealing strip may be clamped between the end portions of the cover sections and the end cleats 14 as shown in Fig. 7. Each flexible sealing strip rides in contact with the meeting edge of the adjoining section 7 and thus maintains a tight joint along all the meeting edges of the hatch cover sections. The packing strips 22 may be secured to the cover sections in any convenient manner, one way of accomplishing this result being shown in Fig. 7 wherein the packing strip is shown extended considerably inside of the adjacent wall of the coaming and bolted to the cover section by means of bolts 26 passing through clamping plates 27 arranged beneath the packing strips. A plurality of clamps 18 is also employed for securing the ends of the complete hatch cover as shown in Fig. 3, said clamps being adapted to hold such ends down against the head flanges 6 of the end walls of the coaming as shown in Fig. 7.

The means for tilting and opening and closing the hatch cover sections will now be described. Connected to and extending upward from certain hatch cover sections are stanchions 28, and said stanchions have pivotal connection at their lower ends with the respective sections 7 so that they may tilt or swing relatively thereto as indicated by a comparison of Figs. 1 and 2. At their upper ends the stanchions are provided with fairleaders or eyes 29 through which passes a single hatch tilting cable 30. This cable is provided at its opposite ends with hooks 31 adapted for detachable engagement with holes in the upper extremities of a pair of rack posts 32 pivotally connected at their lower extremities to the end cross bars 4 as shown in Fig. 6. Each of said rack posts 32 is engaged by a brace 33 having a jointed connection at 34 with the end wall of the coaming as shown in Fig. 6, the said brace having its outer free end bifurcated to embrace the rack posts 32 and to engage the rack teeth 35 thereof. 36 designates flexible stays extending from the upper ends of the rack posts downward and connecting at fixed points 37 on the coaming, said stays 36 serving to limit the outward swinging movement of said posts. The cable 30 is provided at suitable points on each side of each stanchion 28 with stops or shoulders 38 that come in contact with opposite sides of said stanchions to swing the same and produce the necessary tension on the flexible hatch tilting connections 39 consisting of short sections of cable interposed between the upper ends of the stanchions and the upwardly movable meeting edges of the hatch cover sections 7 as best illustrated in Fig. 2, so that when the post 32 at one end is swung outward as shown in Fig. 2 and tension is brought to bear on the hatch tilting cable 30, said cable rocks the stanchions to the corresponding angle and draws on the connections 39, the result of which is that the hatch sections are raised in zigzag order as shown in Fig. 2 preliminary to sliding the sections toward one end of the hatchway. Before swinging one of the posts 32 to the position shown in Fig. 2, however, the rear end of the cable 30 is unhooked from the other rack post 32, as indicated in Fig. 2, the last mentioned post being utilized when the hatch as a whole has to be moved in the opposite direction from that shown in Fig. 2.

The operation of opening the hatch completely is effected by means of one or the other of a pair of hatch opening cables 40 which run beneath the complete hatch, and pass through tubular cable guides 41 extending through the end sections or walls 2 of the coaming as illustrated in Fig. 4. Each of said cables 40 is attached at one end at the point 42 to the underside of one of the end sections of the complete hatch and is provided at a short distance from such end with a draw hook 43 to which is adapted to be connected a draw band 44 the opposite extremities of which are connected to the underside of the same end hatch cover section 7 as indicated in Fig. 4. Thus, after the hatch cover sections are buckled upward as shown in Fig. 2, by drawing on the appropriate cable 40, said cover sections are completely folded upward and drawn toward one end of the hatch-way until they occupy the position illustrated in Fig. 4. The idle opening cable 40 may then be removed from the hatch-way and carried to the outside of the coaming and hooked under one or more of the pendent loose clamps which, when not in use hang alongside the coaming as shown in Fig. 2.

To close the hatch, the hook 43 is disengaged from the draw band 44 and the cable of a block-and-fall on board the vessel, is run through a block at the opposite end of the hatch-way and connected to the draw band 44. By then pulling on said cable, the folded hatch cover as a whole is drawn lengthwise of the hatch-way from a position shown in Fig. 4, to the position illustrated in Figs. 1 and 3. Before doing this it is well to throw the brace 33 out of engagement with the outwardly inclined rack post 32, which allows said post to swing inward to a vertical position and to allow a corresponding movement of the hatch tilting cable 30, the stanchions 28 and the connections 39. The braces 33 then operate to hold the rack posts 32 in a vertical position and the hooks 31 at opposite ends of the cable 30 are connected to said posts as shown in Fig. 1. All of the clamps are then placed in clamping position and screwed down until the hatch cover sections are firmly clamped against the head flange of the coaming, the interposed packing strips forming an air and water tight joint along and around the margin of the hatch-way. In order to prevent the cleats 21 from catching on the end wall of the coaming, curved guides or deflectors 45 are provided which project beyond the end walls of the coaming as shown in Fig. 6, thus causing the cleats 21 to ride up over said coaming wall when the hatch is drawn back to cover the hatch-way.

I claim:—

1. The combination with a hatch coaming of a hatch embodying a plurality of sections hinged together at their meeting edges, stanchions hinged at their lower ends to the sections and extending upward therefrom, a hatch tilting cable connecting said stanchions, at their upper ends, and hatch tilting connections between each stanchion and the adjacent hatch section.

2. The combination with a hatch coaming, of a hatch embodying a plurality of sections hinged together at their meeting edges, stanchions extending upward from said sections, and flexible hatch tilting connections between each post and the adjacent sections.

3. The combination with a hatch coaming, of a hatch embodying a plurality of sections hinged together at their meeting edges, stanchions extending upward from said sections, a hatch tilting cable connecting said sections, and flexible hatch tilting connections leading from said posts to adjacent hatch cover sections.

4. The combination with a hatch coaming, of a hatch embodying a plurality of sections hinged together, stanchions extending upward from said sections and hinged to the sections, a hatch tilting cable having a sliding engagement with said stanchions and provided with stops adapted to coöperate with the stanchions, and flexible hatch tilting connections extending from the stanchions to the adjacent sections.

5. The combination with a hatch coaming, of a hatch embodying a plurality of sections hinged together at their meeting edges, rack posts arranged at opposite ends of the hatchway and pivotally mounted at their lower ends, braces coöperating with said rack posts, and flexible hatch cover tilting connections detachably connected with said posts.

6. The combination with a hatch coaming, of a hatch embodying a plurality of sections hinged together at their meeting edges, keepers at the opposite ends of the hatch way coaming, tongues on the end sections of the hatch cover, means for coupling the tongues to the keepers, and means for folding the cover sections and drawing the same in folded relation toward one end of the hatch-way.

7. The combination with a hatch coaming, of a hatch cover embodying a plurality of sections hinged together at their meeting edges, means for folding said cover sections relatively to each other, an opening cable for drawing the sections toward one end of the hatch way, a guide tube through which the opening cable passes, and a cap for said tube.

8. The combination with a hatch coaming, of a hatch cover embodying a plurality of sections hinged together, end cleats on the opposite ends of each cover section, said cleats being slotted from the outer edges of the sections inward, and clamps having a jointed connection with the coaming and adapted for insertion through said slots.

9. The combination with a hatch coaming, of a hatch cover embodying a plurality of hinged sections, means for folding and sliding said sections lengthwise of the hatchway, and angle irons secured to the under sides of the sections and extending across between opposite coaming walls.

10. The combination with a hatch coaming, of a hatch cover embodying a plurality of hinged sections, marginal packing strips secured to the under sides of the opposite ends of each and all of the sections and adapted to rest on the coaming, and means for clamping the sections down on the coaming.

11. The combination with a hatch coaming, of a hatch cover embodying a plurality of sections hinged together, marginal packing strips secured to the under sides of said sections, and devices for offsetting the sections from and above the coaming.

12. The combination with a hatch coaming, of a hatch cover embodying a plurality of sections hinged together, packing strips secured to the under sides of the sections, and offsetting screws passing vertically through the cover sections and adapted to bear against the upper face of the coaming.

13. The combination with a hatch coaming, of a hatch cover embodying a plurality of sections hinged together, and flexible joint sealing strips secured to the meeting edge of one section and having a curved projecting edge which works in contact with the meeting edge of the adjoining section.

14. The combination with a hatch coaming, of a hatch cover embodying a plurality of sections hinged together, pivoted rack posts at opposite ends of the hatch way, pivoted braces coöperating with said posts, and a hatch tilting cable detachably connected at its opposite ends to said rack posts and also connected at intermediate points on the hatch cover sections.

In testimony whereof I affix my signature in presence of two witnesses.

GUSTAV H. TACKMAN.

Witnesses:
ANTON F. TACKMAN,
CECILIA C. QUINN.